United States Patent Office 2,968,177
Patented Jan. 17, 1961

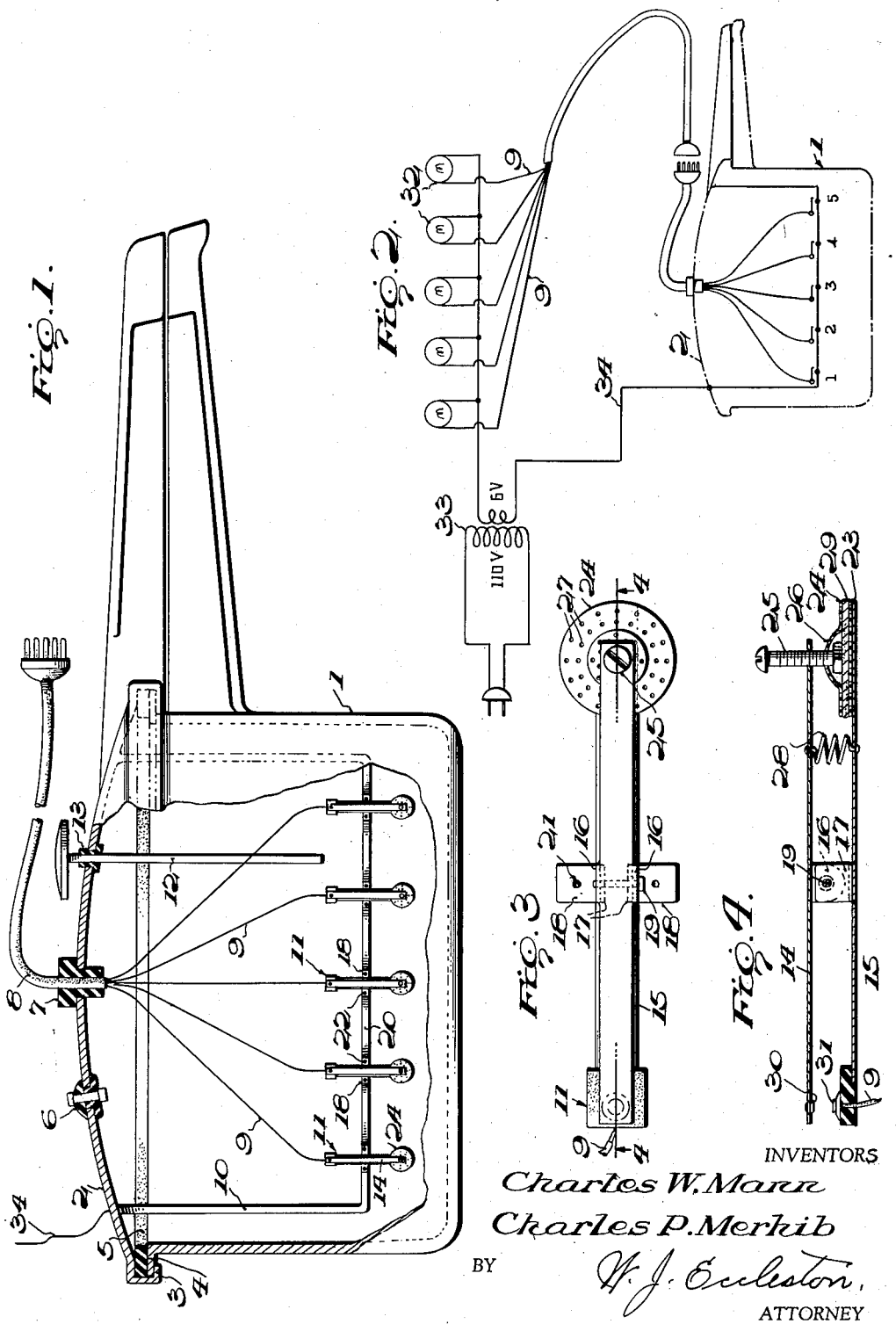

2,968,177
TRANSVERSE SHRINKAGE TESTER

Charles W. Mann, Framingham, and Charles P. Merhib, Worcester, Mass., assignors to the United States of America as represented by the Secretary of the Army Filed Feb. 8, 1956, Ser. No. 564,330

2 Claims. (Cl. 73—15)

(Granted under Title 35, U.S. Code (1952), sec. 266)

The invention described herein, if patented, may be manufactured and used by or for the Government for governmental purposes, without the payment to us of any royalty thereon.

This invention relates to a means for testing certain kinds or types of leather to determine the temperature at which the leather shrinks, such data being of paramount importance in the matter of treating skins as by chrome tanning or the like.

Heretofore, the shrinkage testing of leather has followed several methods. Originally the "boil test" was used, involving the simple expedient of placing a sample in boiling water and then observing the amount of shrinkage. Nearly all other methods and apparatuses for testing the shrinkage of leather required that the specimen be placed under tension. While these prior methods and apparatuses have proved to be entirely satisfactory in many instances, they are not suitable for testing very thin leather or degraded leather, for the reason that the required tension often caused the leather to tear or break apart because of lack of tensile strength in the specimen.

It is an object of the present invention therefore to provide an apparatus for testing leather of low tensile strength, such as very thin glove leather or degraded leather, without applying any tension to the specimen being tested.

Other objects and advantages of the invention will be apparent from the following description when taken in connection with the accompanying drawings, in which, Figure 1 is a side elevational view of the transverse shrinkage tester with parts broken away to disclose the arrangement of the various elements;

Figure 2 is a more or less diagrammatic view disclosing the wiring diagram in detail;

Figure 3 is a plan view of one of the five elements for receiving the specimens or samples of leather to be tested, and, Figure 4 is a longitudinal sectional view taken on line 4—4 of Figure 3.

The present disclosure is intended to be merely illustrative of one form of the invention rather than in any limiting sense and in this embodiment the container which is indicated generally by numeral 1 may be any conventional type of pressure cooker.

This container 1, as is usual, is provided with a closure 2 which is releasably secured to the upper end of the body portion 1 by means of an interrupted inturned flange 3 which cooperates with a similar flange 4 on the upper end of the container 1. The closure is sealed to the container by means of a gasket 5 and a safety valve 6 is installed in the closure 2, as is customary.

Additionally, the closure 2 is provided with a centrally disposed bushing 7 through which is passed a cable 8 in which five electrical conductors 9 are encased and which are connected to the five testing devices as will later appear. Also secured to the undersurface of the closure 2 is a bracket 10 which forms a circuit for the several testers which are generally indicated by the numeral 11. A thermometer 12 of the "Weston" type is also mounted in the closure 2 and sealed thereto by a rubber thimble or the like 13 to prevent the escape of fluid pressure.

Each of the testing units 11 is composed of a pair of plate-supporting members 14 and 15 pivoted intermediate their ends by means of ears 16 extending downwardly from the member 14 and ears 17 which are formed by being bent upwardly from the lateral extending portion 18 formed integrally with the member 15. A bolt 19 extends through the pair of ears 16—17 and forms the hinge pintle or pivot point for the plate-supporting members 14 and 15, and the laterally extending portions 18 serve as fins for securing the several units 11 to the base 20 of the bracket 10 as clearly indicated in Figure 1. To this end the fins are provided with perforations 21 for receiving fastening means 22 for securing the units in position.

Secured to one end of the plate supporting member 15 is a perforated plate 23, here shown as circular in form, and connected to the adjacent end of the plate-supporting member 14 is a similar perforated plate 24. This latter plate is swivelled to the lower end of an adjusting screw 25 as indicated by numeral 26, and the adjusting screw 25 is threaded through the plate-supporting member 14 so as to permit the plate 24 to be adjusted toward and from the plate 23 to clamp a sample or specimen of the leather to be tested therebetween. The plate perforations are indicated by the numeral 27 and serve to permit free access of the liquid to the samples as will later appear.

The plate-supporting members 14 and 15 have attached thereto, adjacent the plate-supporting ends thereof a tension spring 28 which resiliently biases the perforated plates 23 and 24 toward each other to releasably engage the specimen of leather which is indicated by the numeral 29 in Figure 4. The opposite ends of the plate- supporting members 14 and 15, i.e., the ends remote from the plates 23 and 24 are provided with electric contacts 30 and 31 which form a part of electric signaling circuit as more clearly indicated in Figure 2. In this latter figure the signals, of which five are shown, may of course be electric bells, electric lamps, or other suitable types of signals and are indicated by the numeral 32. The signal circuits may be associated with the main electric wiring of the building by a transformer 33 and the circuits are grounded by wiring 34 electrically connected to the lid 2 of the container 1.

In the operation of the device which, as heretofore stated, is for use in determining the shrinkage temperature of relatively weak leather such as glove leather, or of degraded leather, the specimen of leather 29 is placed between the perforated plates 23 and 24 and the plates are adjusted toward each other as may be necessary to bring the parts into clamping position, it being understood that the tension spring 28 will maintain the plates in clamping engagement with the leather sample. In the present illustration five of these units 11 are mounted within the container 1 but it will of course be understood that this number may be increased or decreased as may seem desirable. After the samples have been installed within the various units, the container is charged with water or other liquid to a point at least sufficiently high to cover each of the units and heat is then applied to the bottom of the container to raise the temperature of the liquid. As the temperature of the liquid increases and as the liquid passes through the apertures 27 and into the edges of the leather sample 29 the latter will eventually begin to shrink which results in a swelling of the sample such as will spread the plates 23 and 24 further and further apart until the contacts 30 and 31 are brought into engagement so as to complete the electric circuit and operate one or more of the signals 32. At the times the several signals are operated the temperatures of the liquid may be noted by observing the thermometer 12 and thus the shrinkage temperatures of the particular samples of leather are obtained by this transverse shrinkage of the sample.

In accordance with the patent statutes we have described the preferred structure of testing apparatus, and it will be apparent to those skilled in the art that our apparatus is such as will permit the determination of the shrinkage temperature of thin or weak specimens of leather even though they are incapable of withstanding the stretching usually applied in the shrinkage test of leather.

In accordance with the patent statutes we have described what we now consider to be the preferred apparatus for testing certain types of leather but inasmuch as various minor changes may be made in the structural details, it is intended that all such changes be included within the scope of the appended claims.

We claim:

1. A shrinkage tester comprising a container, a pair of clamping plates, plate-supporting members pivotally connected intermediate their ends within the container, means for securing the plates to the respective adjacent ends of the supporting members, electric contacts on the opposite ends of the supporting members, a spring associated with said members to urge the clamping plates toward each other and maintain the contacts in spaced-apart relationship, an electric signal associated with said contacts, means for heating the container, and a thermometer for indicating the temperature of the contents of the container.

2. A shrinkage tester comprising a container, a pair of perforated clamping plates, plate-supporting members pivotally connected intermediate their ends within the container, means for securing the plates to the respective adjacent ends of the supporting members, electric contacts on the opposite ends of the supporting members, a spring associated with said members to urge the clamping plates toward each other and maintain the contacts in spaced-apart relationship, means for adjusting one of the plates toward and from the other, an electric signal associated with the contacts, means for heating the container, and a thermometer for indicating the temperature of the contents of the container.

References Cited in the file of this patent

UNITED STATES PATENTS

| | | |
|---|---|---|
| 2,026,079 | White et al. | Dec. 31, 1935 |
| 2,392,010 | Stevens | Jan. 1, 1946 |
| 2,479,984 | Stock | Aug. 23, 1949 |
| 2,541,121 | Sparklin | Feb. 13, 1951 |
| 2,831,340 | Crandall et al. | Apr. 22, 1958 |

FOREIGN PATENTS

| | | |
|---|---|---|
| 714,111 | Great Britain | Aug. 25, 1954 |